(12) United States Patent
Ito

(10) Patent No.: US 6,255,362 B1
(45) Date of Patent: *Jul. 3, 2001

(54) OCULAR LENS MATERIAL AND PROCESS FOR PRODUCING THE SAME

(75) Inventor: Eri Ito, Kasugai (JP)

(73) Assignee: Menicon Co., Ltd., Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/248,264

(22) Filed: Feb. 11, 1999

(30) Foreign Application Priority Data

Feb. 17, 1998 (JP) .................................. 10-034800

(51) Int. Cl.⁷ .................................. B29D 11/00
(52) U.S. Cl. .................. 523/107; 528/32; 528/26; 528/499; 528/496; 528/493; 526/310; 526/279; 623/6; 623/4; 264/331.15; 264/1.32; 264/2.6
(58) Field of Search .................. 528/32, 26, 499, 528/496, 493; 526/301, 279, 320; 623/6, 4; 264/331.15, 1.32, 2.6; 351/160 R

(56) References Cited

U.S. PATENT DOCUMENTS

| | | |
|---|---|---|
| 4,141,941 | 2/1979 | Travnicek . |
| 5,260,000 | 11/1993 | Nandu et al. . |
| 5,271,874 | 12/1993 | Osipo et al. . |
| 5,457,140 | 10/1995 | Nunez et al. . |
| 5,498,379 | 3/1996 | Nunez et al. . |
| 5,736,409 | 4/1998 | Nunez et al. . |
| 5,855,825 * | 1/1999 | Ito ........................................ 264/2.6 |

FOREIGN PATENT DOCUMENTS

| | | |
|---|---|---|
| 0 127 321 | 12/1984 | (EP) . |
| 0 796 723 | 9/1997 | (EP) . |
| 1-225913 | 9/1989 | (JP) . |
| 96 31791 | 10/1996 | (WO) . |
| 96-31792 | 10/1996 | (WO) . |
| 97 22019 | 6/1997 | (WO) . |

OTHER PUBLICATIONS

Abstract of WO97/09169, published Mar. 13, 1997.

* cited by examiner

Primary Examiner—Robert Dawson
Assistant Examiner—Kuo-Liang Peng
(74) Attorney, Agent, or Firm—Browdy and Neimark

(57) ABSTRACT

An ocular lens material comprising a polymer prepared by polymerizing a polymerizable component for an ocular lens, containing (A) 20 to 50% by weight of a silicon-containing alkyl acrylate, (B) 20 to 50% by weight of a polysiloxane macromonomer in which a polymerizable group bonds to a siloxane main chain through at least one urethane bond, (C) 10 to 50% by weight of at least one of hydroxyalkyl acrylates and at least one of hydroxyalkyl methacrylates, and (D) 0.01 to 10% by weight of a crosslinkable compound having at least two polymerizable groups, and a process for producing the same. The ocular lens material shows excellent stain resistance and excellent flexibility at the same time in addition to excellent transparency, and can be easily produced by the process.

12 Claims, No Drawings

OCULAR LENS MATERIAL AND PROCESS FOR PRODUCING THE SAME

BACKGROUND OF THE INVENTION

The present invention relates to an ocular lens material and a process for producing the same. More particularly, the present invention relates to an ocular lens material such as a contact lens, for instance, soft contact lens or an intraocular lens, which shows particularly extremely excellent stain resistance and extremely excellent flexibility at the same time, and a process for extremely easily producing the ocular lens material.

Conventionally, in particular, as a soft contact lens material, there has been proposed a material comprising a copolymer prepared by copolymerizing a monomer mixture containing a fluorine-containing monomer or macromonomer, from the viewpoint of stain resistance. However, although the material certainly shows a little stain resistance, the material is poor in flexibility.

In order to impart water-absorbing property to a material and exhibit flexibility, there has been proposed a material comprising a copolymer prepared by copolymerizing a monomer mixture containing a hydroxy group-containing hydrophilic monomer. However, flexibility of the material is insufficient.

In addition, because the above two materials have affinity for lipid, a lens made of each of these materials becomes cloud in white owing to lipid adhering to the materials. As a result, optical property of the lens is lowered. Thus, stain resistance of the materials is insufficient.

As mentioned above, there has not yet been provided a contact lens material which shows particularly extremely excellent stain resistance and extremely excellent flexibility at the same time.

On the other hand, as an intraocular lens material, there has been proposed a material comprising a copolymer prepared by copolymerizing a monomer mixture containing a silicon and/or fluorine-containing monomer or macromonomer, from the viewpoint of flexibility.

However, because the above material has also affinity for lipid, a lens made of the material becomes cloud in white owing to lipid after inserting the lens into an eye. As a result, optical property of the lens is lowered.

As aforementioned, there has not yet been provided an ocular lens material such as a contact lens material or an intraocular lens material, which shows particularly excellent stain resistance and excellent flexibility at the same time, and there has not yet been provided a process for easily producing such an ocular lens material.

An object of the present invention is to provide an ocular lens material which shows particularly excellent stain resistance and excellent flexibility at the same time in addition to excellent transparency.

A further object of the present invention is to provide a process for easily producing the above ocular lens material showing such excellent properties at the same time.

These and other objects of the present invention will become apparent from the description hereinafter.

SUMMARY OF THE INVENTION

In accordance with the present invention, there is provided an ocular lens material comprising a polymer prepared by polymerizing a polymerizable component for an ocular lens, containing (A) 20 to 50% by weight of a silicon-containing alkyl acrylate, (B) 20 to 50% by weight of a polysiloxane macromonomer in which a polymerizable group bonds to a siloxane main chain through at least one urethane bond, and which is represented by the formula (I):

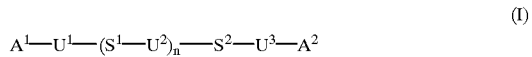

$$A^1\text{—}U^1\text{—}(S^1\text{—}U^2)_n\text{—}S^2\text{—}U^3\text{—}A^2 \qquad (I)$$

[wherein $A^1$ is a group represented by the formula (II):

$$Y^{21}\text{—}R^{31}\text{—} \qquad (II)$$

in which $Y^{21}$ is acryloyloxy group and $R^{31}$ is a linear or branched alkylene group having 2 to 6 carbon atoms;

$A^2$ is a group represented by the formula (III):

$$Y^{22}\text{—}R^{34}\text{—} \qquad (III)$$

in which $Y^{22}$ is acryloyloxy group and $R^{34}$ is a linear or branched alkylene group having 2 to 6 carbon atoms;

$U^1$ is a group represented by the formula (IV)

$$\text{—}X^{21}\text{—}E^{21}\text{—}X^{25}\text{—}R^{32}\text{—} \qquad (IV)$$

in which $X^{21}$ is a covalent bond, oxygen atom or an alkylene glycol group, $E^{21}$ is —NHCO— group (in this case, $X^{21}$ is a covalent bond and an urethane bond is formed between $E^{21}$ and $X^{25}$) or a divalent group derived from a diisocyanate selected from a saturated aliphatic diisocyanate, an alicyclic diisocyanate and an aromatic diisocyanate (in this case, $X^{21}$ is oxygen atom or an alkylene glycol group and $E^{21}$ forms an urethane bond between $X^{21}$ and $X^{25}$), $X^{25}$ is oxygen atom or an alkylene glycol group, and $R^{32}$ is a linear or branched alkylene group having 1 to 6 carbon atoms;

each of $S^1$ and $S^2$ is independently a group represented by the formula (V):

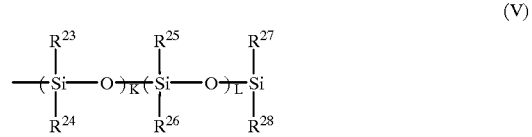

in which each of $R^{23}$, $R^{24}$, $R^{25}$, $R^{26}$, $R^{27}$ and $R^{28}$ is independently an alkyl group having 1 to 3 carbon atoms or phenyl group, K is an integer of 1 to 1500, L is 0 or an integer of 1 to 1500, and (K+L) is an integer of 1 to 1500;

$U^2$ is a group represented by the formula (VI):

$$\text{—}R^{37}\text{—}X^{27}\text{—}E^{24}\text{—}X^{28}\text{—}R^{38}\text{—} \qquad (VI)$$

in which each of $R^{37}$ and $R^{38}$ is independently a linear or branched alkylene group having 1 to 6 carbon atoms, each of $X^{27}$ and $X^{28}$ is independently oxygen atom or an alkylene glycol group, and $E^{24}$ is a divalent group derived from a diisocyanate selected from a saturated aliphatic diisocyanate, an alicyclic diisocyanate and an aromatic diisocyanate (in this case, $E^{24}$ forms an urethane bond between $X^{27}$ and $X^{28}$);

$U^3$ is a group represented by the formula (VII):

$$—R^{33}—X^{26}—E^{22}—X^{22}— \quad (VII)$$

in which $R^{33}$ is a linear or branched alkylene group having 1 to 6 carbon atoms, $X^{22}$ is a covalent bond, oxygen atom or an alkylene glycol group, $X^{26}$ is oxygen atom or an alkylene glycol group, and $E^{22}$ is —NHCO— group (in this case, $X^{22}$ is a covalent bond and an urethane bond is formed between $E^{22}$ and $X^{26}$) or a divalent group derived from a diisocyanate selected from a saturated aliphatic diisocyanate, an alicyclic diisocyanate and an aromatic diisocyanate (in this case, $X^{22}$ is oxygen atom or an alkylene glycol group and $E^{22}$ forms an urethane bond between $X^{22}$ and $X^{26}$); and n is 0 or an integer of 1 to 10)], (C) 10 to 50% by weight of at least one of hydroxyalkyl acrylates and at least one of hydroxyalkyl methacrylates, and (D) 0.01 to 10% by weight of a crosslinkable compound having at least two polymerizable groups.

Furthermore, in accordance with the present invention, there is provided a process for producing an ocular lens material, characterized by mixing a polymerizable component for an ocular lens, containing (A) 20 to 50% by weight of a silicon-containing alkyl acrylate, (B) 20 to 50% by weight of a polysiloxane macromonomer in which a polymerizable group bonds to a siloxane main chain through at least one urethane bond, and which is represented by the formula (I):

$$A^1—U^1—(S^1—U^2)_n—S^2—U^3—A^2 \quad (I)$$

[wherein $A^1$ is a group represented by the formula (II):

$$Y^{21}—R^{31}— \quad (II)$$

in which $Y^{21}$ is acryloyloxy group and $R^{31}$ is a linear or branched alkylene group having 2 to 6 carbon atoms;

$A^2$ is a group represented by the formula (III):

$$Y^{22}—R^{34}— \quad (III)$$

in which $Y^{22}$ is acryloyloxy group and $R^{34}$ is a linear or branched alkylene group having 2 to 6 carbon atoms;

$U^1$ is a group represented by the formula (IV):

$$—X^{21}—E^{21}—X^{25}—R^{32}— \quad (IV)$$

in which $X^{21}$ is a covalent bond, oxygen atom or an alkylene glycol group, $E^{21}$ is —NHCO— group (in this case, $X^{21}$ is a covalent bond and an urethane bond is formed between $E^{21}$ and $X^{25}$) or a divalent group derived from a diisocyanate selected from a saturated aliphatic diisocyanate, an alicyclic diisocyanate and an aromatic diisocyanate (in this case, $X^{21}$ is oxygen atom or an alkylene glycol group and $E^{21}$ forms an urethane bond between $X^{21}$ and $X^{25}$), $X^{25}$ is oxygen atom or an alkylene glycol group, and $R^{32}$ is a linear or branched alkylene group having 1 to 6 carbon atoms;

each of $S^1$ and $S^2$ is independently a group represented by the formula (V):

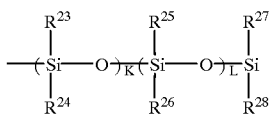

in which each of $R^{23}$, $R^{24}$, $R^{25}$, $R^{26}$, $R^{27}$ and $R^{28}$ is independently an alkyl group having 1 to 3 carbon atoms or phenyl group, K is an integer of 1 to 1500, L is 0 or an integer of 1 to 1500, and (K+L) is an integer of 1 to 1500;

$U^2$ is a group represented by the formula (VI):

$$—R^{37}—X^{27}—E^{24}—X^{28}—R^{38}— \quad (VI)$$

in which each of $R^{37}$ and $R^{38}$ is independently a linear or branched alkylene group having 1 to 6 carbon atoms, each of $X^{27}$ and $X^{28}$ is independently oxygen atom or an alkylene glycol group, and $E^{24}$ is a divalent group derived from a diisocyanate selected from a saturated aliphatic diisocyanate, an alicyclic diisocyanate and an aromatic diisocyanate (in this case, $E^{24}$ forms an urethane bond between $X^{27}$ and $X^{28}$);

$U^3$ is a group represented by the formula (VII):

$$—R^{33}—X^{26}—E^{22}—X^{22}— \quad (VII)$$

in which $R^{33}$ is a linear or branched alkylene group having 1 to 6 carbon atoms, $X^{22}$ is a covalent bond, oxygen atom or an alkylene glycol group, $X^{26}$ is oxygen atom or an alkylene glycol group, and $E^{22}$ is —NHCO— group (in this case, $X^{22}$ is a covalent bond and an urethane bond is formed between $E^{22}$ and $X^{26}$) or a divalent group derived from a diisocyanate selected from a saturated aliphatic diisocyanate, an alicyclic diisocyanate and an aromatic diisocyanate (in this case, $X^{22}$ is oxygen atom or an alkylene glycol group and $E^{22}$ forms an urethane bond between $X^{22}$ and $X^{26}$); and n is 0 or an integer of 1 to 10)], (C) 10 to 50% by weight of at least one of hydroxyalkyl acrylates and at least one of hydroxyalkyl methacrylates, and (D) 0.01 to 10% by weight of a crosslindable compound having at least two polymerizable groups with an organic solvent (I) capable of dissolving the polymerizable component, injecting the obtained mixture into a mold having the desired shape for an ocular lens and then, preparing a polymer by the polymerization reaction, immersing the polymer taken off from the mold in an aqueous organic solvent (II) having compatibility with the organic solvent (I), and then, hydrating the polymer.

The ocular lens material of the present invention shows particularly excellent stain resistance and excellent flexibility at the same time in addition to excellent transparency, and can be suitably used for a contact lens such as, in particular, a soft contact lens or an intraocular lens. In accordance with the process of the present invention, there can be easily produced the above ocular lens material showing such excellent properties at the same time.

DETAILED DESCRIPTION

The ocular lens material of the present invention comprises, as mentioned above, a polymer prepared by polymerizing a polymerizable component for an ocular lens, containing 20 to 50% by weight of a silicon-containing alkyl acrylate (A) (hereinafter sometimes referred to as component (A)), 20 to 50% by weight of a polysiloxane macromonomer represented by the formula (I) (B) (hereinafter sometimes referred to as component (B)), 10 to 50% by weight of at least one of hydroxyalkyl acrylates and at least one of hydroxyalkyl methacrylates (C) (hereinafter sometimes referred to as component (C)), and 0.01 to 10% by weight of a crosslinkable compound having at least two polymerizable groups (D) (hereinafter sometimes referred to as component (D)).

In the present invention, the polymerizable component for an ocular lens, containing the above specific components (A), (B), (C) and (D) in the respectively specific amount is used. Particularly, because a hydroxyalkyl acrylate and a hydroxyalkyl methacrylate, component (C), are used at the same time, the produced ocular lens material shows excellent flexibility based on the hydroxyalkyl acrylate and excellent stain resistance based on the hydroxyalkyl methacrylate at the same time.

The silicon-containing alkyl acylate (A) is a component which mainly imparts oxygen permeability to an ocular lens material and further imparts flexibility to the ocular lens material.

Typical examples of the silicon-containing alkyl acrylate (A) are, for instance, pentamethyldisiloxanylmethyl acrylate, trimethylsiloxydimethylsilylpropyl acrylate, methylbis(trimethylsiloxy)silylpropyl acrylate, tris(trimethylsiloxy) silylpropyl acrylate, mono[methylbis(trimethylsiloxy) siloxy]bis(trimethylsiloxy)silylpropyl acrylate, tris[methylbis(trimethylsiloxy)siloxy]silylpropyl acrylate, trimethylsilylmethyl acrylate, trimethylsilylpropyl acrylate, methylbis(trimethylsiloxy) silylethyltetramethyldisiloxanylmethyl acrylate, tetramethyltriisopropylcyclotetrasiloxanylpropyl acrylate, tetramethyltriisopropylcyclotetrasiloxybis(trimethylsiloxy) silylpropyl acrylate, trimethylsiloxydimethylsilylpropyl acrylate and the like. These can be used alone or in admixture thereof.

Among them, from the viewpoint that effect of imparting high oxygen permeability and flexibility to an ocular lens material at the same time is larger, tris(trimethylsiloxy) silylpropyl acrylate is particularly preferable.

In order to sufficiently impart oxygen permeability and flexibility to an ocular lens material, the amount of the silicon-containing alkyl acrylate (A) in the polymerizable component is at least 20% by weight, preferably at least 25% by weight, more preferably at least 30% by weight. In order to remove a fear that shape stability of an ocular lens material is lowered, the amount of the silicon-containing alkyl acrylate (A) in the polymerizable component is at most 50% by weight, preferably at most 45% by weight, more preferably at most 40% by weight.

The polysiloxane macromonomer used in the present invention is a macromonomer in which a polymerizable group bonds to a siloxane main chain through at least one urethane bond, and which is represented by the formula (I):

(I)

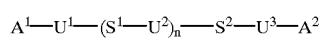

[wherein $A^1$ is a group represented by the formula (II):

$$Y^{21}—R^{31}—\quad\quad\quad\text{(II)}$$

in which $Y^{21}$ is acryloyloxy group and $R^{31}$ is a linear or branched alkylene group having 2 to 6 carbon atoms;

$A^2$ is a group represented by the formula (III):

$$Y^{22}—R^{34}—\quad\quad\quad\text{(III)}$$

in which $Y^{22}$ is acryloyloxy group and $R^{34}$ is a linear or branched alkylene group having 2 to 6 carbon atoms;

$U^1$ is a group represented by the formula (IV):

$$—X^{21}—E^{21}—X^{25}—R^{32}—\quad\quad\quad\text{(IV)}$$

in which $X^{21}$ is a covalent bond, oxygen atom or an alkylene glycol group, $E^{21}$ is —NHCO— group (in this case, $X^{21}$ is a covalent bond and an urethane bond is formed between $E^{21}$ and $X^{25}$) or a divalent group derived from a diisocyanate selected from a saturated aliphatic diisocyanate, an alicyclic diisocyanate and an aromatic diisocyanate (in this case, $X^{21}$ is oxygen atom or an alkylene glycol group and $E^{21}$ forms an urethane bond between $E^{21}$ and $X^{25}$), $X^{25}$ is oxygen atom or an alkylene glycol group, and $R^{32}$ is a linear or branched alkylene gorup having 1 to 6 carbon atoms;

each of $S^1$ and $S^2$ is independently a group represented by the formula (V):

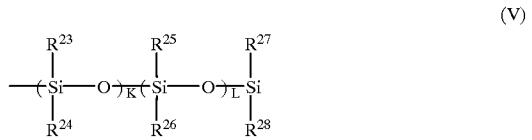

in which each of $R^{23}$, $R^{24}$, $R^{25}$, $R^{26}$, $R^{27}$ and $R^{28}$ is independently an alkyl group having 1 to 3 carbon atoms or phenyl group, K is an integer of 1 to 1500, L is 0 or an integer of 1 to 1500, and (K+L) is an integer of 1 to 1500;

$U^2$ is a group represented by the formula (VI)

$$—R^{37}—X^{27}—E^{24}—X^{28}—R^{38}—\quad\quad\quad\text{(VI)}$$

in which each of $R^{37}$ and $R^{38}$ is independently a linear or branched alkylene group having 1 to 6 carbon atoms, each of $X^{27}$ and $X^{28}$ is independently oxygen atom or an alkylene glycol group, and $E^{24}$ is a divalent group derived from a diisocyanate selected from a saturated aliphatic diisocyanate, an alicyclic diisocyanate and an aromatic diisocyanate (in this case, $E^{24}$ forms an urethane bond between $X^{27}$ and $X^{28}$);

$U^3$ is a group represented by the formula (VII):

$$—R^{33}—X^{26}—E^{22}—X^{22}—\quad\quad\quad\text{(VII)}$$

in which $R^{33}$ is a linear or branched alkylene group having 1 to 6 carbon atoms, $X^{22}$ is a covalent bond, oxygen atom or an alkylene glycol group, $X^{26}$ is oxygen atom or an alkylene glycol group, and $E^{22}$ is —NHCO— group (in this case, $X^{22}$ is a covalent bond and an urethane bond is formed between $E^{22}$ and $X^{26}$) or a divalent gorup derived from a diisocyanate selected from a saturated aliphatic diisocyanate, an alicyclic diisocyanate and an aromatic diisocyanate (in this case, $X^{22}$ is oxygen atom or an alkylene glycol group and $E^{22}$ forms an urethane bond between $X^{22}$ and $X^{26}$); and n is 0 or an integer of 1 to 10)].

The polysiloxane macromonomer (B) is a component which mainly imparts mechanical strength to an ocular lens material and further imparts flexibility to the ocular lens material.

From the viewpoint that effect of imparting mechanical strength and flexibility to an ocular lens material at the same time is larger, a polysiloxane macromonomer represented by the formula:

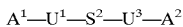

$$A^1-U^1-S^2-U^3-A^2$$

(wherein $A^1$, $A^2$, $U^1$, $U^3$ and $S^2$ are respectively the same as above) is preferable, and a macromonomer represented by the formula:

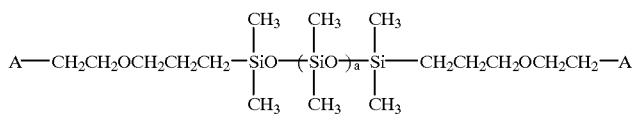

(wherein A is a group represented by the formula:

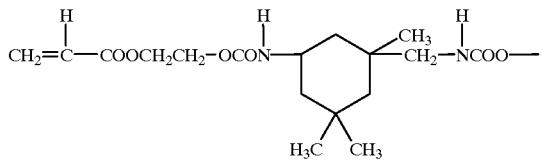

and a is an integer of 20 to 50)
is particularly preferable.

In order to sufficiently impart mechanical strength and flexibility to an ocular lens material, the amount of the polysiloxane macromonomer (B) in the polymerizable component is at least 20% by weight, preferably at least 25% by weight, more preferably at least 30% by weight. In order to remove a fear that shape stability of an ocular lens material is lowered, the amount of the polysiloxane macromonomer (B) in the polymerizable component is at most 50% by weight, preferably at most 45% by weight, more preferably at most 40% by weight.

In the present invention, as mentioned above, both at least one of hydroxyalkyl acrylates and at least one of hydroxyalkyl methacrylates (component (C)) are used. The hydroxyalkyl acrylate is a component which particularly imparts flexibility to an ocular lens material, and the hydroxyalkyl methacrylate is a component which particularly imparts stain resistance such as lipid-stain resistance to an ocular lens material.

It is the great characteristic of the present invention that the above hydroxyalkyl acrylate and the hydroxyalkyl methacrylate are used at the same time. Because these acrylate and methacrylate are used at the same time, excellent flexibility and excellent stain resistance are imparted to an ocular lens material at the same time.

Typical examples of the hydroxyalkyl acrylate are, for instance, a hydroxyalkyl acrylate having an alkyl group of 1 to 10 carbon atoms, such as 2-hydroxyethyl acrylate, 2-hydroxypropyl acrylate, 2,3-dihydroxypropyl acrylate or 2,3-dihydroxy-2-methylpropyl acrylate, and the like. These can be used alone or in admixture thereof.

Among them, from the viewpoints that effect of imparting flexibility to an ocular lens material is large and that handling is easy, 2-hydroxyethyl acrylate is particularly preferable.

Typical examples of the hydroxyalkyl methacrylate are, for instance, a hydroxyalkyl methacrylate having an alkyl group of 1 to 10 carbon atoms, such as 2-hydroxyethyl methacrylate, 2-hydroxypropyl methacrylate, 2,3-dihydroxypropyl methacrylate or 2,3-dihydroxy-2-methylpropyl methacrylate, and the like. These can be used alone or in admixture thereof.

Among them, from the viewpoints that effect of imparting stain resistance to an ocular lens material is large and that handling is easy, 2-hydroxyethyl methacrylate is particularly preferable.

In order to more sufficiently exhibit effect of imparting flexibility and stain resistance to an ocular lens material at the same time, it is preferable that the hydroxyalkyl acrylate having an alkyl group of 1 to 10 carbon atoms and the hydroxyalkyl methacrylate having an alkyl group of 1 to 10 carbon atoms are combined with each other. It is particularly preferable that 2-hydroxyethyl acrylate and 2-hydroxyethyl methacrylate are combined with each other.

In order to sufficiently impart flexibility and stain resistance to an ocular lens material, the amount of component (C) in the polymerizable component is at least 10% by weight, preferably at least 15% by weight, more preferably at least 20% by weight. In order to remove a fear that oxygen permeability of an ocular lens material is lowered, the amount of component (C) in the polymerizable component is at most 50% by weight, preferably at most 45% by weight, more preferably at most 30% by weight.

The weight ratio of at least one of hydroxyalkyl acrylates to at least one of hydroxyalkyl methacrylates is not particularly limited. In consideration that flexibility is sufficiently imparted to an ocular lens material and that excellent shape stability is maintained, it is desired that the weight ratio (hydroxyalkyl acrylate/hydroxyalkyl methacrylate) is at least 20/80, preferably at least 30/70, more preferably at least 40/60. In consideration that stain resistance is sufficiently imparted to an ocular lens material, it is desired that the weight ratio is at most 80/20, preferably at most 70/30, more preferably at most 60/40.

The crosslinkable compound having at least two polymerizable groups (D) is a component which mainly imparts excellent shape stability to an ocular lens material and further improve optical property such as transparency of an ocular lens material.

Typical examples of the crosslinkable compound (D) are, for instance, ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, divinylbenzene, diallyl phthalate, diallyl adipate, triallylisocyanurate, α-methylene-N-vinylpyrrolidone, 4-vinylbenzyl (meth)acrylate, 3-vinylbenzyl (meth)acrylate, 2,2-bis(p-(meth)acryloyloxyphenyl)hexafluoropropane, 2,2-bis(m-(meth)acryloyloxyphenyl)hexafluoropropane, 2,2-bis(o-(meth)acryloyloxyphenyl)hexafluoropropane, 2,2-bis(p-(meth)acryloyloxyphenyl)propane, 2,2-bis(m-(meth)acryloyloxyphenyl)propane, 2,2-bis(o-(meth)acryloyloxyphenyl)propane, 1,4-bis(2-(meth)

acryloyloxyhexafluoroisopropyl)benzene, 1,3-bis(2-(meth) acryloyloxyhexafluoroisopropyl)benzene, 1,2-bis(2-(meth) acryloyloxyhexafluoroisopropyl)benzene, 1,4-bis(2-(meth) acryloyloxy isopropyl)benzene, 1,3-bis(2-(meth) acryloyloxyisopropyl)benzene, 1,2-bis(2-(meth) acryloyloxyisopropyl)benzene and the like. These can be used alone or in admixture thereof.

Among them, from the viewpoints that effect of imparting shape stability to an ocular lens material and effect of improving optical property of an ocular lens material are large, and that handling is easy, ethylene glycol di(meth) acrylate is preferable.

In order to sufficiently impart shape stability to an ocular lens material and sufficiently improve optical property of an ocular lens material, the amount of the crosslinkable compound (D) in the polymerizable component is at least 0.01% by weight, preferably at least 0.05% by weight, more preferably at least 0.1% by weight. In order to remove a fear that flexibility of an ocular lens material is remarkably lowered owing to too heightened hardness thereof, the amount of the crosslinkable compound (D) in the polymerizable component is at most 10% by weight, preferably at most 5% by weight, more preferably at most 3% by weight.

Furthermore, in the present invention, in accordance with properties of the desired ocular lens material, a polymerizable compound (E) copolymerizable with components (A), (B), (C) and (D) can be contained in the polymerizable component in addition to the components (A), (B), (C) and (D).

For instance, in order to make the ocular lens material hard or soft by adjusting hardness of the ocular lens material, there are preferably used as the polymerizable compound (E), for instance, a linear, branched or cyclic alkyl (meth) acrylate such as methyl (meth)acrylate, ethyl (meth)acrylate, isopropyl (meth)acrylate, n-propyl (meth) acrylate, isobutyl (meth)acrylate, n-butyl (meth)acrylate, t-butyl (meth) acrylate, n-pentyl (meth)acrylate, t-pentyl (meth)acrylate, hexyl (meth)acrylate, heptyl (meth)acrylate, nonyl (meth) acrlate, stearyl (meth)acrylate, 2-ethylhexyl (meth)acrylate, n-octyl (meth)acrylate, n-decyl (meth)acrylate, n-dodecyl (meth)acrylate, cyclopentyl (meth)acrylate or cyclohexyl (meth)acrylate; an alkoxyalkyl (meth)acrylate such as 2-ethoxyethyl (meth)acrylate, 3-ethoxypropyl (meth) acrylate, 2-methoxyethyl (meth)acrylate or 3-methoxypropyl (meth)acrylate; an alkylthioalkyl (meth) acrylate such as ethylthioethyl (meth)acrylate or methylthioethyl (meth)acrylate; styrene; a-methylstyrene; an alkylstyrene such as methylstyrene, ethylstyrene, propylstyrene, n-butylstyrene, t-butylstyrene, isobutylstyrene or pentylstyrene; an alkyl-a-methylstyrene such as methyl-α-methylstyrene, ethyl-α-methylstyrene, propyl-α-methylstyrene, n-butyl-α-methylstyrene, t-butyl-α-methylstyrene, isobutyl-α-methylstyrene or pentyl-α-methylstyrene; and the like. These can be used alone or in admixture thereof.

Also, in order to improve compatibility of the component (A) and the component (B) with the component (C), and in order to impart hydrophilic property to an ocular lens material, there are preferably used as the polymerizable compound (E), for instance, an (alkyl)aminoalkyl (meth) acrylate such as 2-dimethylaminoethyl (meth)acrylate or 2-butylaminoethyl (meth)acrylate; an alkyl(meth) acrylamide such as N,N-dimethyl(meth)acrylamide, N,N-diethyl(meth)acrylamide or N,N-methylethyl(meth) acrylamide; an alkylene glycol mono(meth)acrylate such as propylene glycol mono(meth)acrylate; a N-vinyllactam such as N-vinylpyrrolidone; (meth)acrylic acid; maleic anhydride; fumaric acid; a fumaric acid derivative; aminostyrene; hydroxystyrene; and the like. These can be used alone or in admixture thereof.

The amount of the polymerizable compound (E) in the polymerizable component may be suitably adjusted so that the total amount of the polymerizable component becomes to 100% by weight. When the components (A), (B), (C) and (D) and the polymerizable compound (E) are used at the same time, in order to remove a fear that effects based on the components (A), (B), (C) and (D) are not sufficiently exhibited because the amount of these components is too lowered, it is desired that the amount of the polymerizable compound (E) in the polymerizable component is at most 50% by weight, preferably at most 45% by weight. In order to sufficiently exhibit effects based on the polymerizable compound (E), it is desired that the amount of the polymerizable compound (E) in the polymerizable component is at least 1.5% by weight, preferably at least 3% by weight.

In the process for producing an ocular lens material of the present invention, a thermal polymerization initiator, a photo polymerization initiator, a photo polymerization sensitizer and the like may be added to the polymerizable component in which the kinds and amount of each component are suitably adjusted, in accordance with the following polymerization method such as a thermal polymerization method or a photo polymerization method.

Typical examples of the thermal polymerization initiator are, for instance, azobisisobutyronitrile, azobisdimethylvaleronitrile, benzoyl peroxide, t-butyl hydroperoxide, cumene peroxide and the like.

Typical examples of the photo polymerization initiator are, for instance, a benzoin photo polymerization initiator such as methyl orthobenzoylbenzoate, methyl benzoylformate, benzoin methyl ether, benzoin ethyl ether, benzoin isopropyl ether, benzoin isobutyl ether or benzoin n-butyl ether; a phenone photo polymerization initiator such as 2-hydroxy-2-methyl-1-phenylpropane-1-one, p-isopropyl-α-hydroxyisobutylphenone, p-t-butyltrichloroacetophenone, 2,2-dimethoxy-2-phenylacetophenone, α,α-dichloro-4-phenoxyacetophenone or N,N-tetraethyl-4,4-diaminobenzophenone; 1-hydroxycyclohexyl phenyl ketone; 1-phenyl-1,2-propanedione-2-(o-ethoxycarbonyl)oxime; a thioxanthone photo polymerization initiator such as 2-chlorothioxanthone or 2-methylthioxanthone; dibenzosvarron; 2-ethylanthraquinone; benzophenone acrylate; benzophenone; benzil; and the like.

Typical examples of the photo polymerization sensitizer are, for instance, 1,2-benzoanthraquinone and the like.

The thermal polymerization initiator, the photo polymerization initiator, the photo polymerization sensitizer and the like may be used by suitably selecting one member or at least two members from the above exemplified ones. It is desired that the amount of these initiators and sensitizer is 0.002 to 2 parts by weight (hereinafter referred to as part(s)) or so, preferably 0.01 to 1 part or so based on 100 parts of the total amount of the polymerizable component.

In the process for producing an ocular lens material of the present invention, the above polymerizable component is mixed with an organic solvent (I) capable of dissolving the polymerizable component.

Because the organic solvent (I) can dissolve the polymerizable component used in the present invention, a mixture of the polymerizable component and the organic solvent (I) is homogenized and generates no phase separation during the following polymerization reaction, and the obtained polymer does not become cloud in white.

Typical examples of the organic solvent (I) are, for instance, an alcohol having 1 to 12 carbon atoms, such as ethanol, propanol, butanol, petanol, hexanol, octanol or decanol; a ketone having 2 to 4 carbon atoms, such as acetone or methyl ethyl ketone; acetonitrile, chloroform and the like. The organic solvent (I) may be used by suitably selecting a member capable of dissolving the used polymerizable components in accordance with the kinds of the polymerizable components. Also, these can be used alone or in admixture thereof.

From the viewpoint that solubilizing property for the polymerizable components such as components (A), (B) and (C) is excellent, the alcohol having 1 to 12 carbon atoms and the ketone having 2 to 4 carbon atoms are preferable among the above organic solvents (I).

In order to more improve copolymerizable property of the component (A) and the component (B) with the component (C), it is preferable that at least one member of butanol and pentanol is used as the organic solvent (I). In order to prevent evaporation of the organic solvent (I) owing to exothermic reaction during the following polymerization reaction, it is desired that a solvent of which boiling point is at least 40° C. or so, preferably at least 100° C. or so is used as the organic solvent (I). Also, in order to prevent deformation of an ocular lens material owing to heating while the solvent is removed, it is desired that a solvent of which boiling point is at most 150° C. or so is used as the organic solvent (I). Therefore, from the above viewpoints, at least one member of butanol (boiling point: 117° C.) and pentanol (boiling point: 102° to 137° C.) is used as the organic solvent (I) to be mixed with the polymerizable component.

As to the mixing ratio of the polymerizable component to the organic solvent (I), it is desired that the weight ratio of the polymerizable component to the organic solvent (I) (polymerizable component/organic solvent(I)) is at most 75/25, preferably at most 70/30 so that the polymerizable component is sufficiently dissolved in the organic solvent (I). In order to remove a fear that it becomes hard for the obtained polymer to show compatibility with the following organic solvent (II) because the amount of the residual organic solvent (I) in the polymer is too large, it is desired that the weight ratio is at least 30/70, preferably at least 35/65.

In the process for producing an ocular lens material of the present invention, a mixture obtained by mixing the polymerizable component with the organic solvent (I) is injected into a mold having the desired shape for an ocular lens and then, the polymerization reaction is carried out to prepare a polymer.

The above mold may be a mold having the desired shape for an ocular lens such as a contact lens or an intraocular lens. In order to produce an intraocular lens, a mold having a shape corresponding to a one-piece intraocular lens in which an optic and haptics are united with each other may be used. Also, a mold having a shape corresponding to the optic and a mold having a shape corresponding to the haptics may be used.

After the mixture of the polymerizable component and the organic solvent (I) is injected into the mold, the polymerization reaction is carried out to prepare a polymer. A method of the polymerization reaction is not particularly limited and usual methods can be employed.

Examples of the method of the polymerization reaction are, for instance, a method (thermal polymerization method) comprising firstly heating a mixture of the polymerizable component to which the thermal polymerization initiator is added and the organic solvent (I) at 30° to 60° C. or so for several hours to several tens of hours to polymerize the polymerizable component and then, completing the polymerization by successively increasing the temperature to 120° to 140° C. or so for several hours to ten and several hours; a method (photo polymerization method) comprising irradiating a ray such as ultraviolet-ray, having a wavelength corresponding to the absorption band of activity of the photo polymerization initiator to a mixture of the polymerizable component to which the photo polymerization initiator is added and the organic solvent (I) to polymerize the polymerizale component; a method comprising carrying out the polymerization by using the combination of the thermal polymerization method and the photo polymerization method; and the like.

When the above thermal polymerization method is employed, the heating may be carried out in a constant temperature bath or a constant temperature chamber, and an electromagnetic wave such as microwave may be used, and also, the heating may be carried out stepwise. When the above photo polymerization method is employed, the photo polymerization sensitizer may be added to the mixture.

In the process for producing an ocular lens material of the present invention, the thus obtained polymer is taken off from the mold and immersed in an aqueous organic solvent (II) having compatibility with the organic solvent (I).

The present invention is largely characterized by immersing the polymer in the aqueous organic solvent (II) having compatibility with the organic solvent (I).

The obtained polymer contains non-reacted polymerizable components in addition to the organic solvent (I) used during the polymerization reaction. However, when the polymer is immersed in the aqueous organic solvent (II) having compatibility with the organic solvent (I), the organic solvent (II) permeates into the polymer, and the organic solvent (II) and the organic solvent (I) contained in the polymer are dissolved with each other to dilute the organic solvent (I) in the polymer, and then, the non-reacted polymerizable components in the polymer elute into the organic solvent (II).

Accordingly, in the present invention, there are no fears that phase separation and cloud in white occur because of the residual non-reacted polymerizable components and the residual organic solvent (I) in the polymer during the polymerization reaction, and that cloud in white occurs because of the residual organic solvent (II) in the polymer. So, safety of the obtained ocular lens material is improved, differentiated from a conventional case that the solution polymerization is carried out by simply using an organic solvent.

The organic solvent (II) is, as mentioned above, a solvent having compatibility with the organic solvent (I), which is used for diluting the organic solvent (I). Also, as mentioned after, even if the organic solvent (II) is not completely removed from the polymer and slightly remains in the polymer, because the organic solvent (II) is an aqueous solvent, it can be completely removed by the next hydration of the polymer. Furthermore, it is desired that the organic solvent (II) is a solvent having high volatility and relatively lower boiling point of, for instance, at most 100° C. or so.

Typical examples of the organic solvent (II) are, for instance, an alcohol having 1 to 3 carbon atoms, such as methanol, ethanol or propanol; a ketone having 2 to 4 carbon atoms, such as acetone or methyl ethyl ketone; and the like. These can be used alone or in admixture thereof. The kinds of the organic solvent (II) may be the same as that of the organic solvent (I) or different from that of the organic solvent (I), and there are no limitations.

From the viewpoints that compatibility with the organic solvent (I) is excellent, that compatibility with the polymerizable components such as, in particular, the components (A), (B) and (C) is excellent and that non-reacted polymerizable components easily elute, the alcohol having 1 to 3 carbon atoms and the ketone having 2 to 4 carbon atoms are preferable among the above organic solvents (II).

In the present invention, when at least one member of butanol and pentanol is used as the organic solvent (I), from the viewpoints that at least one member of butanol and pentanol in the polymer is more effectively diluted and that non-reacted polymerizable components largely containing, in particular, the components (A) and (B) in the polymer more effectively elute, it is preferable that at least one member of ethanol and propanol is used as the organic solvent (II). Thus, it is preferable that there is used at least one member of ethanol and propanol which is excellent in compatibility with at least one member of butanol and pentanol, which is immediately and easily removed during the following hydration of the polymer, and which shows high water-soluble property.

The time for immersing the polymer in the organic solvent (II) varies according to the kinds of the polymer and cannot unconditionally determined. It is desired that the time is a necessary time for reducing the amount of the non-reacted polymerizable components contained in the finally obtained ocular lens material to at most 5% by weight and for sufficiently diluting the organic solvent (I) in the polymer, such as 40 to 100 minutes or so.

When the polymer is immersed in the organic solvent (II), in order to accelerate elution of the organic solvent (I) and the like into the organic solvent (II), air may be introduced into the organic solvent (II) by, for instance, the following methods.

In the process for producing an ocular lens material of the present invention, it is desired that after the polymer is immersed in the organic solvent (II), the polymer is dried before hydrating the polymer.

In the case that the polymer is dried, there are advantages that the organic solvent (I) which possibly remains in the polymer is more surely removed and that the organic solvent (II) which has permeated into the polymer is sufficiently removed. In particular, in the case that at least one member of ethanol (boiling point: 79° C.) and propanol (boiling point: 82° C.) which have lower boiling point is used as the organic solvent (II), when the polymer is dried, the boiling point of at least one member of ethanol and propanol own is lowered based on azeotropic effects of at least one member of ethanol and propanol and the silicon-containing alkyl acrylate (A), so that at least one member of ethanol and propanol is more easily removed.

The drying temperature of the polymer after immersing the polymer in the organic solvent (II) may be a temperature or so at which the organic solvent (II) in which the organic solvent (I) is dissolved is sufficiently removed, and is not particularly limited. It is desired that the drying temperature is a temperature at which the organic solvent (II) is sufficiently removed for a short period of time and is less than deformation temperature of the polymer. For instance, it is usually desired that the drying temperature is 40° to 110° C. or so.

The drying time of the polymer may be a necessary time or so for sufficiently removing the organic solvent (II), and is not particularly limited, as the same as the drying temperature. It is desired that the drying time is, as usual, 5 to 100 minutes or so.

Examples of a drying method of the polymer are, for instance, an air-drying method, a method by using a drying agent, a heat-drying method, a reduced pressure-drying method and the like.

The polymer which has been, as occasion demands, dried is hydrated, so that the ocular lens material of the present invention can be produced.

When the polymer is hydrated, even if the organic solvent (II) which maybe contains the non-reacted polymerizable components and the organic solvent (I) slightly remains in the polymer, the organic solvent (II) immediately and easily elutes into water because the organic solvent (II) is water-soluble. Accordingly, the ocular lens material never occurs cloud in white owing to the organic solvent (II), safety of the lens is never lowered, and producing time is shortened.

A method for hydrating the polymer is not particularly limited. For instance, a method comprising immersing the polymer in water such as distilled water, isotonic sodium chloride solution or an aqueous solution of which osmotic pressure and pH are suitably adjusted, and the like can be employed.

During the hydration of the polymer, there is a fear that water is saturated with the organic solvent (II) which has eluted into water, so that the amount of eluting organic solvent (II) from the polymer reduces as time goes on. Accordingly, in order to disperse eluting components in water and accelerate elution of the organic solvent (II) and the like into water, it is desired that the polymer is hydrated by introducing air into water in which the polymer is immersed.

A method for introducing air into water is not particularly limited. There can be employed, for instance, a method comprising introducing the prescribed gas into water, vaporizing at least one part of the organic solvent (II) and the like in water with generated bubbles, capturing vaporized organic solvent (II) and the like with the bubbles and taking out captured organic solvent (II) and the like when the bubbles rise to the surface and are released out of water; and the like.

Examples of the gas which is introduced into water are, for instance, oxygen gas, nitrogen gas, air, water vapor and the like.

In the present invention, in order to completely remove a fear that the non-reacted components, the organic solvent (I) and the organic solvent (II) remain in the polymer, to make sure, it is desired that the polymer is heated at the same time as the hydration of the polymer or after the hydration of the polymer.

A method for heating the polymer at the same time as the hydration of the polymer or after the hydration of the polymer is not particularly limited. A method comprising boiling by electrical heating, bath-solution heating or gas heating, and the like can be employed.

When the polymer is heated at the same time as the hydration of the polymer or after the hydration of the polymer, the heating temperature of the polymer is not particularly limited. It is desired that the heating temperature is a temperature at which remaining components are surely removed for a short period of time and is less than deformation temperature of the polymer. For instance, it is usually desired that the heating temperature is 35° to 100° C. or so.

The heating time of the polymer may be a necessary time or so for surely removing the residual components, and is not particularly limited, as the same as the heating temperature. It is desired that the heating time is, as usual, 10 to 120 minutes or so.

As mentioned above, the desired ocular lens material of the present invention can be produced. In the present invention, as occasion demands, mechanical processes such as cutting process and polishing process may be carried out. It is usually desired that the polymer which is not hydrated yet is mechanically processed.

The ocular lens material of the present invention shows particularly excellent stain resistance and excellent flexibility at the same time in addition to excellent transparency. In accordance with the process of the present invention, such an excellent ocular lens material can be easily produced.

The present invention is more specifically described and explained by means of the following Examples, and it is to be understood that the present invention is not limited to the Examples.

EXAMPLES 1 TO 3 AND COMPARATIVE EXAMPLES 1 TO 2

After an ocular lens component composed of a mixture of a polymerizable components and a polymerization initiator which were shown in Table 1 was mixed with an organic solvent (I) (1-butanol) in the proportion shown in Table 2, the obtained mixture was injected into a mold having the shape of a contact lens (made of polypropylene, corresponding to a contact lens having a diameter of 13.8 mm and a thickness of 0.1 mm).

Then, the mold was transferred into a constant temperature bath and the photo polymerization was carried out at 35° C. by irradiating a light having a wavelength of 360 nm to the content in the mold for 30 minutes using a mercury lamp to give a polymer having the shape of a contact lens.

The obtained polymer was taken off from the mold and dried, and after the polymer was immersed in 100 ml of an aqueous organic solvent (II) (2-propanol) shown in Table 2 for 60 minutes, the polymer was dried at 110° C. for 60 minutes in a circulating drier.

Then, the dried polymer was immersed in isotonic sodium chloride solution and hydrated by the absorption of water to give a contact lens.

Transparency of the obtained contact lens was examined in accordance with the following method. The results are shown in Table 2.

[Transparency]

The appearance of the contact lens was observed with naked eyes and evaluated on the basis of the following criteria for evaluation.

(Criteria for Evaluation)

A: There is no cloud at all, transparency is extremely excellent and it is suitable for a contact lens.

B: There is slight cloud, however, it has sufficient transparency as a contact lens.

C: There is cloud in white and transparency is poor, accordingly, it is difficult to use as a contact lens.

D: There is sure cloud in white and transparency is extremely poor, accordingly, it is impossible to use as a contact lens.

In addition, a polymer having a diameter of about 15 mm and a thickness of 0.2 mm was prepared in the mold in the same manner as the above and then, the polymer was dried and hydrated in the same manner as the above to give an ocular lens material.

Flexibility and stain resistance of the obtained ocular lens material were examined in accordance with the following method. The results are shown in Table 2.

[Flexibility]

The periphery of the ocular lens material was fixed, and the center of the ocular lens material was fixed to an apparatus for loading by using a spherical tool of which tip's diameter was about 3 mm.

The fixed ocular lens material was loaded till the loaded amount reached about 20 g and then, the loading was stopped. Stress just after stopping loading ("So"($g/mm^2$)) was measured. After the loaded ocular lens material was allowed to stand for 30 seconds, stress ("S"($g/mm^2$)) was measured.

Using the measured values "So" and "S", stress relaxation coefficient (%) was calculated on the basis of the following equation.

In the case that stress relaxation coefficient is at least 15%, the ocular lens material is poor in repulsive property and shape recovery. Accordingly, it cannot be recognized that such ocular lens material has sufficient flexibility which is suitable for an ocular lens, in particular, such as a soft contact lens or an intraocular lens.

$$\text{Stress relaxation coefficient } (\%) = \{(So-S)/So\} \times 100$$

[Stain Resistance]

There were mixed 0.3 g of oleic acid, 0.3 g of linoleic acid, 4.0 g of tripalmitic acid, 1.0 g of cetyl alcohol, 0.3 g of palmitic acid, 4.0 of spermaceti, 0.4 g of cholesterol, 0.4 g of cholesterol palmitate and 14.0 g of york lecithin with each other to give an artificial tear lipid solution (buffer solution of pH7). The ocular lens material was immersed in 2 ml of the artificial tear lipid solution in a glass bottle, and the glass bottle was shaken at 37° C. for 5 hours.

After five hours, the ocular lens material was picked up from the artificial tear lipid solution and then, lipid components which adhered to the ocular lens material were extracted by immersing the ocular lens material in 1 ml of a mixed solution of ethanol and ether (ethanol:ether=3:1 (volume ratio)).

To 500 $\mu$l of the obtained lipid extracted solution was added 1 ml of concentrated sulfuric acid and then, 3 mg of vanillin and 2 ml of phosphoric acid were added thereto. Adhering lipid amount ($mg/cm^2$) of the ocular lens material was quantitated.

In the case that adhering lipid amount is at least 1 $mg/cm^2$, lipid stain easily adheres to the ocular lens material and the ocular lens material is poor in stain resistance. Accordingly, it cannot be recognized that such ocular lens material is suitable for an ocular lens.

Each code listed on Table 1 shows the following compound.

SK5021: Tris(trimethylsiloxy)silylpropyl acrylate

SK6006: Macromonomer represented by the formula:

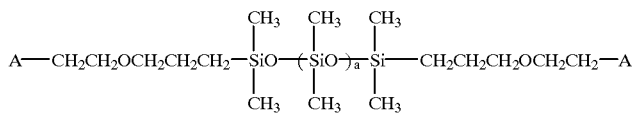

(wherein A is a group represented by the formula:

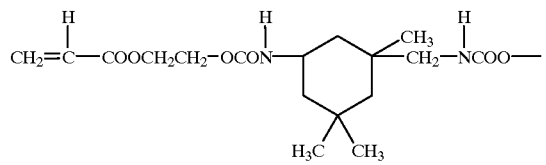

and a is an integer of 20 to 50)
2HEMA: 2-Hydroxyethyl methacrylate
2HEA: 2-Hydroxyethyl acrylate
EDMA: ethylene glycol dimethacrylate
Darocur: 2-Hydroxy-2-methyl-1-phenyl-propane-1-one The amount of the polymerization initiator shown in Table 1 is an amount (part) based on 100 parts of the total amount of the polymerizable component.

In Table 2, existence of the drying step for the polymer, which was employed in order to more sufficiently remove the organic solvent (II), was also described.

From the results shown in Table 2, it can be understood that contact lenses (ocular lens materials) in Examples 1 to 3 show excellent flexibility and excellent stain resistance at the same time in addition to excellent transparency and are suitable as contact lenses (ocular lenses).

On the contrary, it can be understood that contact lens (ocular lens material) produced without the hydroxyalkyl acrylate in Comparative Example 1 has high stress relaxation coefficient of 25% and is remarkably poor in flexibility. Accordingly, it can be understood that the contact lens (ocular lens material) in Comparative Example 1 is not suitable as a contact lens (ocular lens).

Also, it can be understood that contact lens (ocular lens material) produced without the hydroxyalkyl methacrylate in Comparative Example 2 has high adhering lipid amount of 1.421 mg/cm$^2$ and is remarkably poor in stain resistance. Accordingly, it can be understood that the contact lens (ocular lens material) in Comparative Example 2 is not suitable as a contact lens (ocular lens).

In addition to the ingredients used in the Examples, other ingredients can be used in the Examples as set forth in the specification to obtain substantially the same results.

TABLE 1

| Composition of ocular lens component | | | | | | Code |
|---|---|---|---|---|---|---|
| Polymerizable component (% by weight) | | | | | Polymerization initiator (part) | of ocular lens |
| SK5021 | SK6006 | 2HEMA | 2HEA | EDMA | Darocur | component |
| 30 | 40 | 10 | 19 | 1 | 0.2 | a |
| 30 | 40 | 14.5 | 14.5 | 1 | 0.2 | b |
| 30 | 40 | 19 | 10 | 1 | 0.2 | c |
| 30 | 40 | 29 | — | 1 | 0.2 | d |
| 30 | 40 | — | 29 | 1 | 0.2 | e |

TABLE 2

| | Kinds of ocular lens component and amount thereof (% by weight) | Organic solvent | | Existence of drying step | Contact lens Transparency | Ocular lens material | |
|---|---|---|---|---|---|---|---|
| | | Amount of (I) (1-butanol) (% by weight) | Kinds of (II) | | | Flexibility (Stress relaxation coefficient (%)) | Stain resistance (Adhering lipid amount (mg/cm$^2$)) |
| Ex. No. | | | | | | | |
| 1 | a (40) | 60 | 2-Propanol | Existence | A | 10 | 0.922 |
| 2 | b (40) | 60 | 2-Propanol | Existence | A | 11 | 0.832 |
| 3 | c (40) | 60 | 2-Propanol | Existence | A | 11 | 0.614 |
| Com Ex. | | | | | | | |
| 1 | d (40) | 60 | 2-Propanol | Existence | A | 25 | 0.522 |
| 2 | e (40) | 60 | 2-Propanol | Existence | A | 10 | 1.421 |

What is claimed is:

1. An ocular lens material comprising a polymer prepared by polymerizing a polymerizable component for an ocular lens, containing
   (A) 20 to 50% by weight of a silicon-containing alkyl acrylate,
   (B) 20 to 50% by weight of a polysiloxane macromonomer in which a polymerizable group bonds to a siloxane main chain through at least one urethane bond, and which is represented by the formula (I):

$$A^1—U^1—(S^1—U^2)_n—S^2—U^3—A^2 \quad (I)$$

wherein $A^1$ is a group represented by the formula (II):

$$Y^{21}—R^{31}— \quad (II)$$

in which $Y^{21}$ is acryloyloxy group and $R^{31}$ is a linear or branched alkylene group having 2 to 6 carbon atoms; $A^2$ is a group represented by the formula (III):

$$Y^{22}—R^{34}— \quad (III)$$

in which $Y^{22}$ is acryloyloxy group and $R^{34}$ is a linear or branched alkylene group having 2 to 6 carbon atoms; $U^1$ is a group represented by the formula (IV):

$$—X^{21}—E^{21}—X^{25}—R^{32}— \quad (IV)$$

in which $X^{21}$ is a covalent bond, oxygen atom or an alkylene glycol group, $E^{21}$ is —NHCO— group (in this case, $X^{21}$ is a covalent bond and a urethane bond is formed between $E^{21}$ and $X^{25}$) or a divalent group derived from a diisocyanate selected from the group consisting of a saturated aliphatic diisocyanate, an alicyclic diisocyanate and an aromatic diisocyanate (in this case, $X^{21}$ is oxygen atom or an alkylene glycol group and $E^{21}$ forms a urethane bond between $X^{21}$ and $X^{25}$), $X^{25}$ is oxygen atom or an alkylene glycol group, and $R^{32}$ is a linear or branched alkylene group having 1 to 6 carbon atoms;
   each of $S^1$ and $S^2$ is independently a group represented by the formula (V):

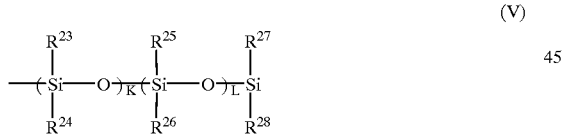

in which each of $R^{23}$, $R^{24}$, $R^{25}$, $R^{26}$, $R^{27}$ and $R^{28}$, is independently an alkyl group having 1 to 3 carbon atoms or phenyl group, K is an integer of 1 to 1500, L is 0 or an integer of 1 to 1500, and (K+L) is an integer of 1 to 1500; $U^2$ is a group represented by the formula (VI):

$$—R^{37}—X^{27}—E^{24}—X^{28}—R^{38}— \quad (VI)$$

in which each of $R^{37}$ and $R^{38}$ is independently a linear or branched alkylene group having 1 to 6 carbon atoms, each of $X^{27}$ and $X^{28}$ is independently oxygen atom or an alkylene glycol group, and $E^{24}$ is a divalent group derived from a diisocyanate selected from the group consisting of a saturated aliphatic diisocyanate, an alicyclic diisocyanate and an aromatic diisocyanate (in this case, $E^{24}$ forms a urethane bond between $X^{27}$ and $X^{28}$);

$U^3$ is a group represented by the formula (VII):

$$—R^{33}—X^{26}—E^{22}—X^{22}— \quad (VII)$$

in which $R^{33}$ is a linear or branched alkylene group having 1 to 6 carbon atoms, $X^{22}$ is a covalent bond, oxygen atom or an alkylene glycol group, $X^{26}$ is oxygen atom or an alkylene glycol group, and $E^{22}$ is —NHCO-group (in this case, $X^{22}$ is a covalent bond and a urethane bond is formed $E^{22}$ and $X^{26}$) or a divalent group derived from a diisocyanate selected from the group consisting of a saturated aliphatic diisocyanate, an alicyclic diisocyanate and an aromatic diisocyanate (in this case, $X^{22}$ is oxygen atom or an alkylene glycol group and $E^{22}$ forms a urethane bond between $X^{22}$ and $X^{26}$); and
   n is 0 or an integer of 1 to 10),
   (C) 10 to 50% by weight of at least one of hydroxyalkyl acrylates and at least one of hydroxyalkyl methacrylates, and
   (D) 0.01 to 10% by weight of a crosslinkable compound having at least two polymerizable groups.

2. The ocular lens material of claim 1, wherein the weight ratio of at least one of hydroxyalkyl acrylates to at least one of hydroxyalkyl methacrylates (hydroxyalkyl acrylate/hydroxyalkyl methacrylate) is 20/80 to 80/20.

3. The ocular lens material of claim 1, wherein said silicon-containing alkyl acrylate is tris(trimethylsiloxy)silylpropyl acrylate.

4. The ocular lens material of claim 1, wherein said hydroxyalkyl acrylate is a hydroxyalkyl acrylate having an alkyl group of 1 to 10 carbon atoms, and said hydroxyalkyl methacrylate is a hydroxyalkyl methacrylate having an alkyl group of 1 to 10 carbon atoms.

5. The ocular lens material of claim 1, wherein said hydroxyalkyl acrylate is 2-hydroxyethyl acrylate and said hydroxyalkyl methacrylate is 2-hydroxyethyl methacrylate.

6. A process for producing an ocular lens material, characterized by
   mixing a polymerizable component for an ocular lens, containing
   (A) 20 to 50% by weight of a silicon-containing alkyl acrylate,
   (B) 20 to 50% by weight of a polysiloxane macromonomer in which a polymerizable group bonds to a siloxane main chain through at least one urethane bond, and which is represented by the formula (I):

$$A^1—U^1—(S^1—U^2)_n—S^2—U^3—A^2 \quad (I)$$

wherein $A^1$ is a group represented by the formula (II):

$$Y^{21}—R^{31}— \quad (II)$$

in which $Y^{21}$ is acryloyloxy group and $R^{31}$ is a linear or branched alkylene group having 2 to 6 carbon atoms; $A^2$ is a group represented by the formula (III):

$$Y^{22}—R^{34}— \quad (III)$$

in which $Y^{22}$ is acryloyloxy group and $R^{34}$ is a linear or branched alkylene group having 2 to 6 carbon atoms; $U^1$ is a group represented by the formula (IV):

$$—X^{21}—E^{21}—X^{25}—R^{32}— \quad (IV)$$

in which $X^{21}$ is a covalent bond, oxygen atom or an alkylene glycol group, $E^{21}$ is —NHCO— group in this case, $X^{21}$ is a covalent bond and a urethane bond is formed between $E^{21}$ and $X^{25}$) or a divalent group derived from a diisocyanate selected from the group consisting of a saturated aliphatic diisocyanate, an alicyclic diisocyanate and an aromatic diisocyanate (in this case, $X^{21}$ is oxygen atom or an alkylene glycol group and $E^{21}$ forms a urethane bond between $X^{21}$ and $X^{25}$), $X^{25}$ is oxygen atom or an alkylene glycol group, and $R^{32}$ is a linear or branched alkylene group having 1 to 6 carbon atoms;

each of $S^1$ and $S^2$ is independently a group represented by the formula (V):

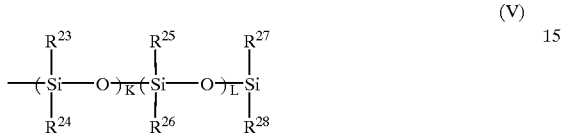

(V)

in which each of $R^{23}$, $R^{24}$, $R^{25}$, $R^{26}$, $R^{27}$ and $R^{28}$ is independently an alkyl group having 1 to 3 carbon atoms or phenyl group, K is an integer of 1 to 1500, L is 0 or an integer of 1 to 1500, and (K+L) is an integer of 1 to 1500; $U^2$ is a group represented by the formula (VI):

(VI)

in which each of $R^{37}$ and $R^{38}$ is independently a linear or branched alkylene group having 1 to 6 carbon atoms, each of $X^{27}$ and $X^{28}$ is independently oxygen atom or an alkylene glycol group, and $E^{24}$ is a divalent group derived from a diisocyanate selected from the group consisting of a saturated aliphatic diisocyanate, an alicyclic diisocyanate and an aromatic diisocyanate (in this case, $E^{24}$ forms a urethane bond between $X^{27}$ and $X^{28}$);

$U^3$ is a group represented by the formula (VII):

(VII)

in which $R^{33}$ is a linear or branched slkylene group having 1 to 6 carbon atoms, $X^{22}$ is a covalent bond, oxygen atom or an alkylene glycol group, $X^{26}$ is oxygen atom or an alkylene glycol group, and $E^{22}$ is —NHCO-group (in this case, $X^{22}$ is a covalent bond and a urethane bond is formed $E^{22}$ and $X^{26}$) or a divalent group derived from a diisocyanate selected from the group consisting of a saturated aliphatic diisocyanate, an alicyclic diisocyanate and an aromatic diisocyanate (in this case, $X^{22}$ is oxygen atom or an alkylene glycol group and $E^{22}$ forms a urethane bond between $X^{22}$ and $X^{26}$); and n is 0 or an integer of 1 to 10), (C) 10 to 50% by weight of at least one of hydroxyalkyl acrylates and at least one of hydroxyalkyl methacrylates, and (D) 0.01 to 10% by weight of a crosslinkable compound having at least two polymerizable groups with an organic solvent (I) capable of dissolving the polymerizable component, injecting the obtained mixture into a mold having the desired shape for an ocular lens, preparing a polymer by a polymerization reaction, immersing the polymer taken off from said mold in an aqueous organic solvent (II) having compatibility with the organic solvent (I), and, hydrating said polymer.

7. The process of claim 6, wherein the weight ratio of the polymerizable component for an ocular lens to the organic solvent (I) (polymerizable component/organic solvent (I)) is 30/70 to 75/25.

8. The process of claim 6, where in said organic solvent (I) is at least one member the group consisting of an alcohol having 1 to 12 carbon atoms and a ketone having 2 to 4 carbon atoms.

9. The process of claim 6, wherein said organic solvent (II) is at least one member selected from the group consisting of an alcohol having 1 to 3 carbon atoms and a ketone having 2 to 4 carbon atoms.

10. The process of claim 6, wherein after said polymer is immersed in the aqueous solvent (II), the polymer is dried before hydrating the polymer.

11. The process of claim 6, wherein said polymer is hydrated by introducing air into water in which the polymer is immersed.

12. The process of claim 6, wherein said polymer is heated at the same time as the hydration of the polymer or after the hydration of the polymer.

* * * * *